July 3, 1956   N. ZAKARIAN   2,753,178
AUTO DAMPING SUSPENSION DEVICE
Filed March 9, 1953
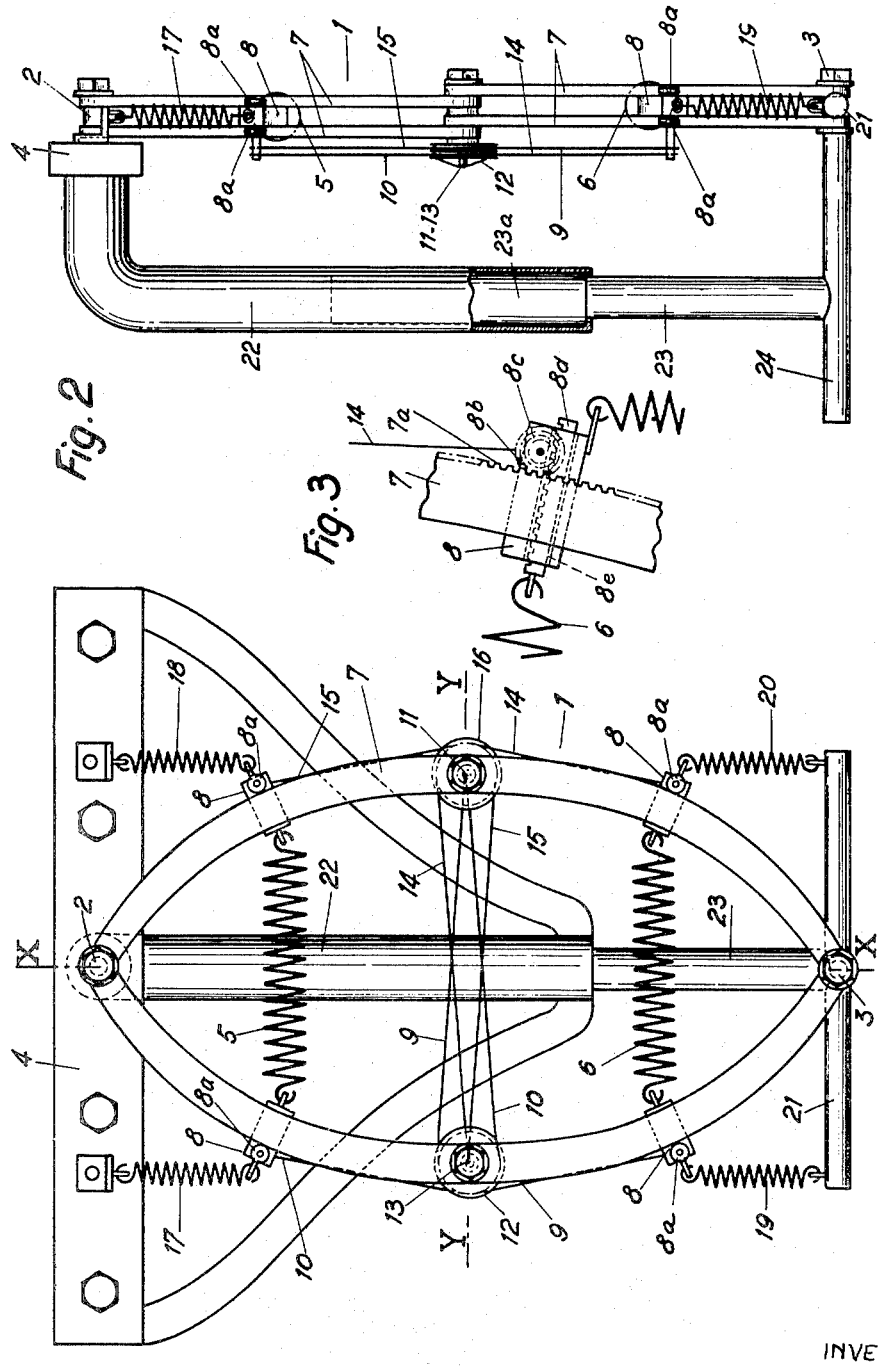
INVENTOR:
NOUCHEN ZAKARIAN

United States Patent Office 2,753,178
Patented July 3, 1956

2,753,178

AUTO DAMPING SUSPENSION DEVICE

Nouchen Zakarian, Paris, France

Application March 9, 1953, Serial No. 341,245

Claims priority, application France March 8, 1952

10 Claims. (Cl. 267—20)

The object of this invention is to provide an auto-damping suspension device intended more particularly for the suspension of automobile vehicles and designed for being interposed between the chassis and the axle of the vehicle, or between the chassis and the wheel when an independent-wheels suspension is dealt with. This device, however, may have other applications and serve for example as bumper for a vehicle or a parachuting apparatus. Indeed, its construction permits of obtaining a damping effect with springs of quasi constant flexure or working in variable conditions.

This auto-damping suspension device, such as provided by the invention, consists of a deformable articulated assembly comprising one or several springs disposed in such way that at least one of their supports is automatically displaced vertically and horizontally in respect to the remainder of the device when this latter is being deformed, this displacement being effected in the desired sense to obtain a damping effect of quasi-constant flexure or with variable work.

The invention will be more clearly understood by referring to the accompanying drawings given by way of non-limiting example and in which:

Fig. 1 shows in face-elevation an auto-damping suspension device according to the invention, Fig. 2 is a profile view of the same device, with part broken away, and Fig. 3 shows a modified form of device according to the invention.

The device shown in Figs. 1 and 2 is constituted substantially by an articulate and deformable frame 1 composed of four elongated link members or sides. The pivots 2 and 3 of vertical axis X—X, of this frame are rigid respectively with a stationary part and with a part subjected to shocks or to efforts; the articulation pin 2 may be secured for example onto a cross piece 4 rigid with the chassis of an automobile, the articulation pin 3 being secured for example onto a wheel axle. Two coil springs 5 and 6 are disposed parallelly to the horizontal axis Y—Y of frame 1 and symmetrically in respect to this axis so as to work under tensile stress when an effort applied to the pin 3 tends to move the latter toward the pin 2. Each branch of the frame 1 is constituted, as is seen in Fig. 2, by two parallel plates 7. Each end of springs 5 and 6 is connected to a block 8 adapted to slide between the plates 7 of the corresponding frame side.

The displacements of sliding blocks 8 are controlled for example by four cables. Two of these cables 9 and 10 are on one hand attached to the articulation pin 11, pass around a two groove sheave 12 mounted on the articulation pin 13 and are, on the other hand, attached respectively to the sliding blocks 8 disposed on both sides of the pin 13. The other two cables 14, 15 are mounted similarly. Attached on one hand to the pin 13 they pass around a two groove sheave 16 mounted on the pin 11, and are, on the other hand, attached respectively to the two sliding blocks 8 disposed on both sides of the pin 11. The displacements of sliding blocks 8 are guided by rollers 8a rolling on the edges of plates 7 constituting the frame 1.

Springs 17, 18, 19, 20 tend to return each of the four sliding blocks 8, respectively, to its initial position on the corresponding side or branch of the articulated frame. Each of these springs has one end attached to a sliding block 8. The springs 17 and 18 are, on the other hand, attached to the cross piece 4, while the second ends of springs 19 and 20 are attached to a part 21 rigid with the pin 3.

Finally, in order to prevent the frame 1 from pivoting about the axle 2 and to impart to the assembly a sufficient rigidity in the sense perpendicularly to the frame plane, there is provided an extension arm 22 whose upper portion is secured onto the cross piece 4 and in the interior of which may slide the upright 23 whose sliding motion is limited by a shoulder 23a. The upright 23 is provided with a part 24 rigid with the pin 3.

In Fig. 3 which shows a modified form of device according to the invention, it is seen that the edge of each of the plates 7 is provided with teeth 7a meshing with two pinions 8b carried by each sliding block 8 and on the axle of which there is fixedly mounted a toothed wheel 8c of smaller diameter, this wheel cooperating with a rack 8d mounted for sliding movement in a groove 8e made in each sliding block 8.

When the pin 3 moves toward the top of the drawing under the action of a shock or overload, the pins 11 and 13 move away from each other, pull the cables 9, 10, 14, 15 and consequently displace the sliding blocks 8 which move toward these pins and drag along the springs 5 and 6.

In the said modification (Fig. 3) the displacement of the sliding blocks 8 actuates, owing to the rotation of the pinions 8b and 8c, the racks 8d to which springs 5, 6 are respectively fastened and consequently causes the racks 8d to move away from, or towards, one another, in respect to the vertical axis X—X of the articulated frame. When the support members 4 and 21 move toward each other and the frame formed by the pivotally interconnected members 7 is deformed so that the inner ends of these plate members 7, respectively interconnected by the pivot pins 11 and 13, move outwardly, the mountings 8 will move towards pivot pins 11 and 13, respectively. The pinions 8b will thereby rotate on the rack 7a formed on the outer edges of the member 7 and rotate the pinions 8c in the same direction to move the racks 8d in outward direction. The springs 5 and 6 are therefore tensioned not only by the outward movement of the mountings 8 according to the outward movement of the portions of the members 7 on which the mountings 8 are located, but the spring tension is further increased by the outward movement of the racks 8d. Thereby, the forces of the springs 5 and 6 tending to restore the plate member 7 to its initial position are further increased.

The removal of the springs 5, 6 from the pins 2 and 3, respectively, is therefore the greater, the greater the deformation of the device. It results therefrom that their action is sensed on the frame sides with a leverage in respect to these pins, that keeps on increasing at the same time as the effort of deformation. There is thus obtained a very efficient damping effect since the deformation encounters a resistance that becomes greater and greater as it is accentuated. The device described operates at the same time with quasi-constant flexure since the suspension becomes stiffer when the vehicle load augments, owing to the leverages and points of support that augment the spring strength, supposing that a weak spring be replaced by a stronger spring.

It will be noted that the frame sides may be curved as shown, or they may comprise inclined planes; their curvature or their degree of inclination may be selected so as to comply with determined conditions of displacement of the supports of springs in accordance with the deformations of the frame.

Without departing from the spirit of the invention, changes may be effected in the particular constructions and arrangement of parts of apparatus.

Thus, for example, use may be made of differently disposed springs which, in particular, may be compression springs. Furthermore, the cable control systems may be replaced by appropriate sprocket systems.

What is claimed is:

1. A shock absorber device comprising, in combination, a pair of supports movable toward and away from each other; at least one pair of elongated link members pivotally connected at one end to one of said supports, and at their opposite ends to the other support movable relative thereto for movement with their opposite ends toward each other upon movement of said supports away from each other and for movement away from each other upon movement of said supports toward each other; resilient means connected between said pair of elongated members constantly urging said opposite ends thereof together and being displaceable relative to said elongated members along the length thereof; and means operable upon movement of said supports toward each other for displacing said resilient means relative to said elongated members toward said opposite ends thereof while said opposite ends move apart, whereby the action of said resilient means resists the force moving said supports together and increases with the increase of said force.

2. A shock absorber device comprising, in combination, a pair of supports movable toward and away from each other; two pairs of elongated link members each pair pivotally connected at one end to a different one of said supports, and at their opposite ends to the other pair of elongated link members so as to form a deformable frame, said opposite ends of said pairs of link members being movable toward each other upon movement of said supports away from each other, and movable away from each other upon movement of said supports toward each other; resilient means connected between each of said pairs of link members constantly urging the opposite ends thereof together and being displaceable relative to said link members along the length thereof; and means operable upon movement of said supports toward each other for displacing said resilient means relative to said elongated link members toward the respective opposite ends thereof while said opposite ends move apart, whereby the action of said resilient means resists the force moving said supports together and increases with the increase of said force.

3. A shock absorber device comprising, in combination, a pair of supports movable toward and away from each other; two pairs of elongated link members each pair pivotally connected at one end to a different one of said supports, and at their opposite ends to the other pair of elongated link members so as to form a deformable frame, said opposite ends of said pairs of link members being movable toward each other upon movement of said supports away from each other, and movable away from each other upon movement of said supports toward each other; resilient means connected between each of said pairs of link members constantly urging the opposite ends thereof together and being displaceable relative to said link members along the length thereof; urging means urging the resilient means of each pair of link members away from the respective opposite ends thereof; and means operable upon movement of said supports toward each other for displacing said resilient means relative to said elongated link members toward the respective opposite ends thereof while said opposite ends move apart, whereby the action of said resilient means resists the force moving said supports together and increases with the increase of said force.

4. A shock absorber device comprising, in combination, a pair of supports movable toward and away from each other; two pairs of elongated link members each pair pivotally connected at one end to a different one of said supports, and at their opposite ends to the other pair of elongated link members so as to form a deformable frame, said opposite ends of said pairs of link members being movable toward each other upon movement of said supports away from each other, and movable away from each other upon movement of said supports toward each other; resilient means connected between each of said pair of link members constantly urging the opposite ends thereof together and being displaceable relative to said link members along the length thereof; and means comprising elongated flexible means connected to said resilient means and to said link members and operable upon movement of said support toward each other for displacing said resilient means relative to said elongated link members toward the respective opposite ends thereof while said opposite ends move apart, whereby the action of said resilient means resists the force moving said supports together and increases with the increase of said force.

5. A shock absorber device comprising, in combination, a pair of supports movable toward and away from each other; two pairs of elongated link members each pair pivotally connected at one end to a different one of said supports, and at their opposite ends to the other pair of elongated link members so as to form a deformable frame, said opposite ends of said pairs of link members being movable toward each other upon movement of said supports away from each other, and movable away from each other upon movement of said supports toward each other; resilient means connecting the link members in each pair together constantly urging the opposite ends thereof together and being displaceable relative to said link members along the length thereof; and means comprising pulley means at said opposite ends of said link members and elongated flexible means, said elongated flexible means being connected to said resilient means and to said pulley means and said means being operable upon movement of said supports toward each other for displacing said resilient means relative to said elongated link members toward the respective opposite ends thereof while said opposite ends move apart, whereby the action of said resilient means resists the force moving said supports together and increases with the increase of said force.

6. A shock absorbing device comprising, in combination, a stationary support; a movable support being movable toward and away from that stationary support; two pairs of elongated link members, each pair pivotally connected at one end to a different one of said supports and at the other ends to the other pair of said elongated link members so as to form a deformable frame, said other ends of said pair of link members being movable toward each other upon movement of said movable support away from said stationary support, and movable away from each other upon movement of said movable support towards said stationary support; two substantially parallel coil springs located between said pairs of link members, respectively; two pairs of mounting means for mounting said coil springs, said mounting means being movably attached to said link members, respectively, for movement along the length thereof between a normal position and a displaced position; means for moving said mounting means to said displaced position upon movement of said other ends of said link members away from each other; resilient means connected to said mounting means and to said supports, respectively, and tending to keep said mounting means in their normal positions; and means for maintaining said frame in a plane.

7. A device as defined in claim 6, and including link pins linking said other ends of said elongated link members together; and wherein said means for moving said mounting means comprises a pair of pulleys respectively mounted on said link pins, and cables respectively attached at one end to said mounting means and leading over one of said pulleys to the link pin on which the other of said pulleys is mounted and being attached at the other end to said link pin.

8. A device as defined in claim 6, wherein said link members have gear teeth; and wherein each of said mounting means includes a rack and pinion mechanism cooperating with said gear teeth for increasing the tension of said coil springs upon movement of said mounting means to said displaced position.

9. A device as defined in claim 6, wherein said means for maintaining said frame in one plane comprise a hollow extension arm fixedly connected to said stationary support, and an upright telescoping in said hollow arm and forming part of said movable support.

10. A device as defined in claim 6, wherein said elongated link members are curved so that the two pairs of pivotally connected link members form a deformable frame of elipse-like configuration.

References Cited in the file of this patent

UNITED STATES PATENTS

| | | |
|---|---|---|
| 1,396,573 | Harley | Nov. 8, 1921 |
| 1,612,163 | Todd | Dec. 28, 1926 |
| 2,024,372 | Kromm et al. | Dec. 17, 1935 |
| 2,112,293 | Kromm et al. | Mar. 29, 1938 |
| 2,459,591 | Shumaker et al. | Jan. 18, 1949 |